(12) United States Patent
Totsuka et al.

(10) Patent No.: US 8,812,206 B2
(45) Date of Patent: Aug. 19, 2014

(54) CONTROL SYSTEM FOR BELT-TYPE CONTINUOUSLY VARIABLE TRANSMISSION

(75) Inventors: Hirohiko Totsuka, Wako (JP); Hitoshi Takayama, Nagakute (JP)

(73) Assignee: Honda Motor Co., Ltd., Tokyo (JP)

( * ) Notice: Subject to any disclaimer, the term of this patent is extended or adjusted under 35 U.S.C. 154(b) by 139 days.

(21) Appl. No.: 13/444,398

(22) Filed: Apr. 11, 2012

(65) Prior Publication Data

US 2012/0259521 A1   Oct. 11, 2012

(30) Foreign Application Priority Data

Apr. 11, 2011   (JP) .................................. 2011-087805

(51) Int. Cl.
| | | |
|---|---|---|
| G06F 7/00 | (2006.01) | |
| F16H 61/662 | (2006.01) | |
| F16H 59/36 | (2006.01) | |
| F16H 61/00 | (2006.01) | |
| F16H 61/12 | (2010.01) | |
| F16H 61/06 | (2006.01) | |
| F16H 59/44 | (2006.01) | |
| F16H 59/68 | (2006.01) | |
| F16H 59/48 | (2006.01) | |

(52) U.S. Cl.
CPC .......... *F16H 61/66272* (2013.01); *F16H 59/44* (2013.01); *F16H 59/36* (2013.01); *F16H 61/00* (2013.01); *F16H 61/12* (2013.01); *F16H 2059/683* (2013.01); *F16H 61/06* (2013.01); *F16H 59/68* (2013.01); *F16H 61/662* (2013.01); *F61H 61/02* (2013.01); *F16H 59/48* (2013.01)
USPC ................................. 701/58; 474/28; 477/45

(58) Field of Classification Search
USPC .......... 701/58; 474/18, 28; 477/45, 46, 49, 69
See application file for complete search history.

(56) References Cited

U.S. PATENT DOCUMENTS 6,135,915 A * 10/2000  Aoki et al. ....................... 477/43
2012/0258825 A1 * 10/2012  Kodama et al. ................. 474/69

FOREIGN PATENT DOCUMENTS

| CN | 1807936 A | 7/2006 |
|---|---|---|
| CN | 101089428 A | 12/2007 |
| JP | 5-79550 A | 3/1993 |
| JP | 2000-018347 A | 1/2000 |

OTHER PUBLICATIONS

Chinese Office Action dated Apr. 24, 2014, issued in corresponding Chinese Patent Application No. 201210068483.X with English translation (22 pages).

* cited by examiner

*Primary Examiner* — Thomas G Black
*Assistant Examiner* — Luke Huynh
(74) *Attorney, Agent, or Firm* — Westerman, Hattori, Daniels & Adrian, LLP

(57) ABSTRACT

Surplus pressure is obtained from a difference between a hydraulic pressure value detected by a hydraulic pressure sensor and a target supplied hydraulic pressure. A determination is made about whether or not a possible hydraulic pressure in a prescribed time will become lower than a minimum required hydraulic pressure based on a current surplus pressure and a changing rate of the surplus pressure. If the possible hydraulic pressure is lower than the minimum required hydraulic pressure, correction is conducted to increase supplied hydraulic pressure. Accordingly, control is conducted so that the regularly required surplus pressure can be reduced to a minimum required amount.

7 Claims, 9 Drawing Sheets

CONTROL SYSTEM FOR BELT-TYPE CONTINUOUSLY VARIABLE TRANSMISSION

BACKGROUND

The present invention relates to a control system for a belt-type continuously variable transmission, particularly to achievement of appropriate control of surplus lateral pressure to a belt (clamp pressure) in the belt-type continuously variable transmission.

A belt-type continuously variable transmission has been known and used which includes a driving pulley in which a pulley width is adjustable, a driven pulley in which a pulley width is adjustable, and a belt member wound around between the driving pulley and the driven pulley. The transmission has a driving-side hydraulic actuator for controlling the pulley width (axial thrust control) of the driving pulley and a driven-side hydraulic actuator for controlling the pulley width (axial thrust control) of the driven pulley. By providing hydraulic pressure to both the hydraulic actuators, axial thrusts of both the pulleys are controlled to adjust settings of the pulley widths, thereby variably setting a gear change ratio in a nonstep manner.

In a control system for such a kind of belt-type continuously variable transmission, to prevent belt slip, the hydraulic pressure (axial thrust) acting on the driven pulley is controlled to apply a minimum required pulley axial thrust (belt clamping force). The balance between the pulley axial thrusts to adjust the change gear ratio is set by controlling the hydraulic pressure (axial thrust) acting on the driving pulley. In such a case, the axial thrust of the driven pulley is determined with a belt-transmitted torque (torque transmitted between the pulleys) and the gear change ratio. A pulley axial thrust ratio between the driving pulley and the driven pulley is obtained from a target gear change ratio and a transmitted torque ratio. A pulley axial thrust deviation is obtained from dynamic speed change characteristics and a feedback element of the gear change ratio. Consequently, the driving-side axial thrust (hydraulic pressure) is set to the value composed of the sum of the product of the driving-side pulley axial thrust and the pulley axial thrust ratio and the pulley axial thrust deviation.

Japanese Patent Application Publication No. 2000-18347 (Patent Document 1) discloses that a target speed change can be achieved while preventing a belt slip by use of the minimum required pulley axial thrust even in such a speed change that the axial thrust of the driving pulley largely decreases.

Japanese Patent Application Publication No. Hei 5-79550 (Patent Document 2) discloses that control is performed in response to pulsation of hydraulic pressure.

In a belt-type continuously variable transmission (CVT), it is required to output hydraulic pressure not lower than the minimum required pressure as a lateral pressure to the belt (clamp pressure) to prevent belt slip. Accordingly, it was required to set a surplus pressure in consideration of factors lowering hydraulic pressure such as pulsation, environmental change, aging degradation, product variability (variability among individual CVT products), and the like. Although a technology has been developed such that a hydraulic pressure sensor is used to detect decrease in hydraulic pressure due to environmental change or aging degradation to regularly keep a surplus pressure low, a certain amount of surplus pressure must be secured to cope with instantaneous decrease in hydraulic pressure or occurrence of pulsation. However, securing a surplus pressure may result in decreased fuel efficiency and further in decreased durability of the belt; therefore it is desired to improve such a situation.

SUMMARY OF THE INVENTION

The present invention has been made in consideration of such an above-described situation, an object is to provide a control system for a belt-type continuously variable transmission that allows control such that a regularly required surplus pressure can be reduced to a minimum required amount.

The present invention provides a control system (50) for a belt-type continuously variable transmission which transmits an engine output to wheels by changing gears in a nonstep manner, the control system adapted to obtain a target gear change ratio (itgt) and a target gear change ratio changing rate (ditgt) based on a vehicle speed and acceleration instruction information, obtain a driven pulley required axial thrust (Qdnnec) required for motive power transmission in response to a transmission input torque (Tin) and a gear change ratio (i) without causing a belt slip, set the driven pulley required axial thrust (Qdnnec) as a driven pulley target axial thrust (Qdncmd), set an axial thrust required by a driven pulley for changing the gear change ratio to the target gear change ratio (itgt) at the target gear change ratio changing rate (ditgt) by use of the driven pulley target axial thrust (Qdncmd) as a driving pulley target axial thrust (Qdrcmd), and conduct speed change control based on target supplied hydraulic pressures (Pdrsup, Pdnsup) set in response to the driven pulley target axial thrust (Qdncmd) and the driving pulley target axial thrust (Qdrcmd). Such a control system (50) for a belt-type continuously variable transmission comprises a correction section (B5) adapted to predict a hydraulic pressure decreasing amount in a prescribed time at a current hydraulic pressure changing rate based on a hydraulic pressure value detected by a hydraulic pressure sensor, and conduct a correction to increase supplied hydraulic pressure if a possible hydraulic pressure based on the predicted hydraulic pressure decreasing amount is lower than a minimum required hydraulic pressure. It should be noted that the symbols and numbers affixed in the parentheses are corresponding reference numerals and symbols of elements in the drawings of an embodiment, which will be described later.

According to the present invention, when the hydraulic pressure decreasing amount in the prescribed time is predicted with the current hydraulic pressure changing rate, and the prediction indicates that the possible hydraulic pressure may become lower than the minimum required hydraulic pressure, the correction is conducted to increase the supplied hydraulic pressure. Accordingly, control can be conducted such that the minimum required surplus pressure is constantly secured. In other words, a particular amount of extra hydraulic pressure is not continuously added to secure a regular surplus pressure, but control is conducted such that the supplied hydraulic pressure is increased only when necessary in securing the minimum required surplus pressure. Accordingly, the regularly required surplus pressure can be reduced to the minimum required amount, improvements in fuel efficiency and durability of a belt can be expected. Further, since an appropriate surplus pressure can be secured in pulsation of hydraulic pressure or instantaneous decrease in hydraulic pressure, a belt slip can be prevented, thus achieving an improvement in toughness.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION

Figure 1:
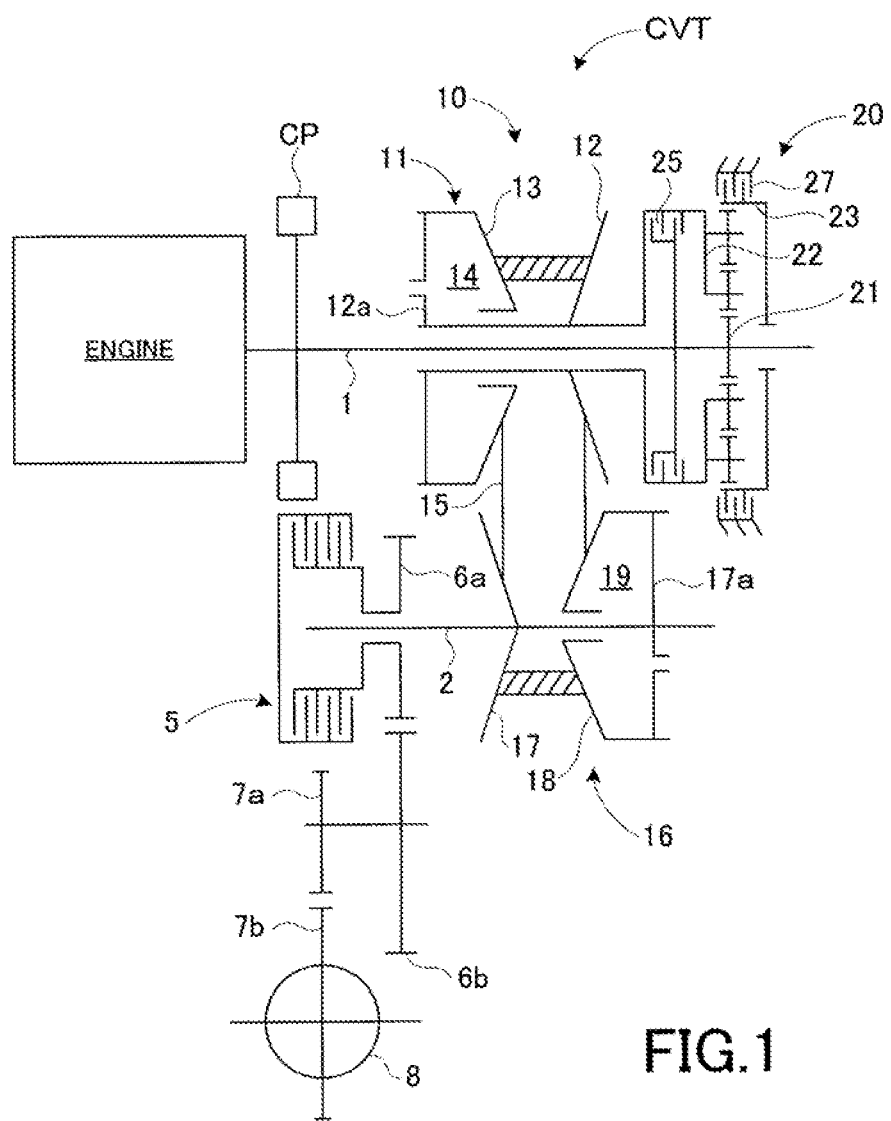
FIG. 1 is a skeleton drawing illustrating an exemplary configuration of a belt-type continuously variable transmission to which the present invention is applicable.

FIG. 1 illustrates a configuration of a belt-type continuously variable transmission which carries out control in accordance with the present invention. A known device such as disclosed in the Patent Document 1 may be used as the belt-type continuously variable transmission in the embodiments. A belt-type continuously variable transmission CVT includes a metal V-belt mechanism 10 disposed between an input shaft 1 and a counter shaft 2, a planetary gear type forward-reverse switching mechanism 20 disposed between the input shaft 1 and a driving-side movable pulley 11, and a main clutch 5 disposed between the counter shaft 2 and an output member (such as a differential mechanism 8).

The continuously variable transmission CVT is used for a vehicle. The input shaft 1 is connected to an output shaft of an engine ENG via a coupling mechanism CP. Motive power transmitted to the differential mechanism 8 is transmitted to left and right wheels.

The metal V-belt mechanism 10 includes the driving pulley 11 disposed on the input shaft 1, a driven pulley 16 disposed on the counter shaft 2, and a metal V-belt 15 wound around between both the pulleys 11 and 16.

The driving pulley 11 includes a fixed half pulley 12 rotatably disposed on the input shaft 1, and a movable half pulley 13 which is movable in the axial direction with respect to the fixed half pulley 12. On a lateral side of the movable half pulley 13, a driving-side cylinder chamber 14 is formed, which is surrounded by a cylinder wall 12a coupled to the fixed half pulley 12. Hydraulic pressure Pdr supplied into the driving-side cylinder chamber 14 produces a lateral pressure for moving the movable half pulley 13 in the axial direction, in other words, an axial thrust Qdr of the driving pulley.

The driven pulley 16 includes a fixed half pulley 17 fixed to the counter shaft 2, and a movable half pulley 18 which is movable in the axial direction with respect to the fixed half pulley 17. On a lateral side of the movable half pulley 18, a driven-side cylinder chamber 19 is formed, which is surrounded by a cylinder wall 17a coupled to the fixed half pulley 17. Hydraulic pressure Pdn supplied into the driven-side cylinder chamber 19 produces a lateral pressure for moving the movable half pulley 18 in the axial direction, in other words, an axial thrust Qdn of the driven pulley.

Appropriate control of hydraulic pressures Pdr and Pdn supplied to both the cylinder chambers 14 and 19 allows setting of appropriate lateral pressures to pulleys which prevents slip of the belt 15 and changes in the pulley widths of both the pulleys 11 and 16. Accordingly, the radius of the V-belt wound around the pulleys is changed, thereby allowing continuously variation of the gear change ratio.

The planetary gear type forward-reverse switching mechanism 20 has a double-pinion planetary gear train, in which a sun gear 21 is coupled to the input shaft 1, a carrier 22 is coupled to the fixed half pulley 12, and a ring gear 23 can be held in a fixed state by a reverse brake 27. The planetary gear type forward-reverse switching mechanism 20 also has a forward clutch 25 which is capable of coupling the sun gear 21 and the ring gear 23 together. When the forward clutch 25 is engaged, all the gears 21, 22, and 23 integrally rotate with the input shaft 1, and the driving pulley 11 is driven in the same direction as the input shaft 1 (forward direction). On the other hand, when the reverse brake 27 is engaged, since the ring gear 23 is held in a fixed state, the carrier 22 is driven in the opposite direction to the sun gear 21, and the driving pulley 11 is driven in the opposite direction (reverse direction) to the input shaft 1.

The main clutch 5 controls motive power transmission between the counter shaft 2 and output-side members. Engagement of the main clutch enables motive power transmission between those. Controlling its engaging force allows control of a torque transmission capacity (torque capacity) between the input side and the output side. Accordingly, when the main clutch 5 is engaged, engine output whose speed is changed by the metal V-belt mechanism 10 is transmitted to the differential mechanism 8 via gears 6a, 6b, 7a, and 7b and divided to be transmitted to the left and right wheels (not shown) by the differential mechanism 8. Further, when the main clutch 5 is released, the motive power transmission is disabled, and the transmission becomes a neutral state.

In a control system for the above-described belt-type continuously variable transmission CVT, the supplied hydraulic pressures Pdr and Pdn of the driving-side and driven-side cylinder chambers 14 and 19 are controlled to control the axial thrusts Qdr and Qdn of the driving pulley and driven pulley, thereby setting minimum axial thrusts while preventing belt slip and thereby carrying out appropriate speed change control.

Figure 2:
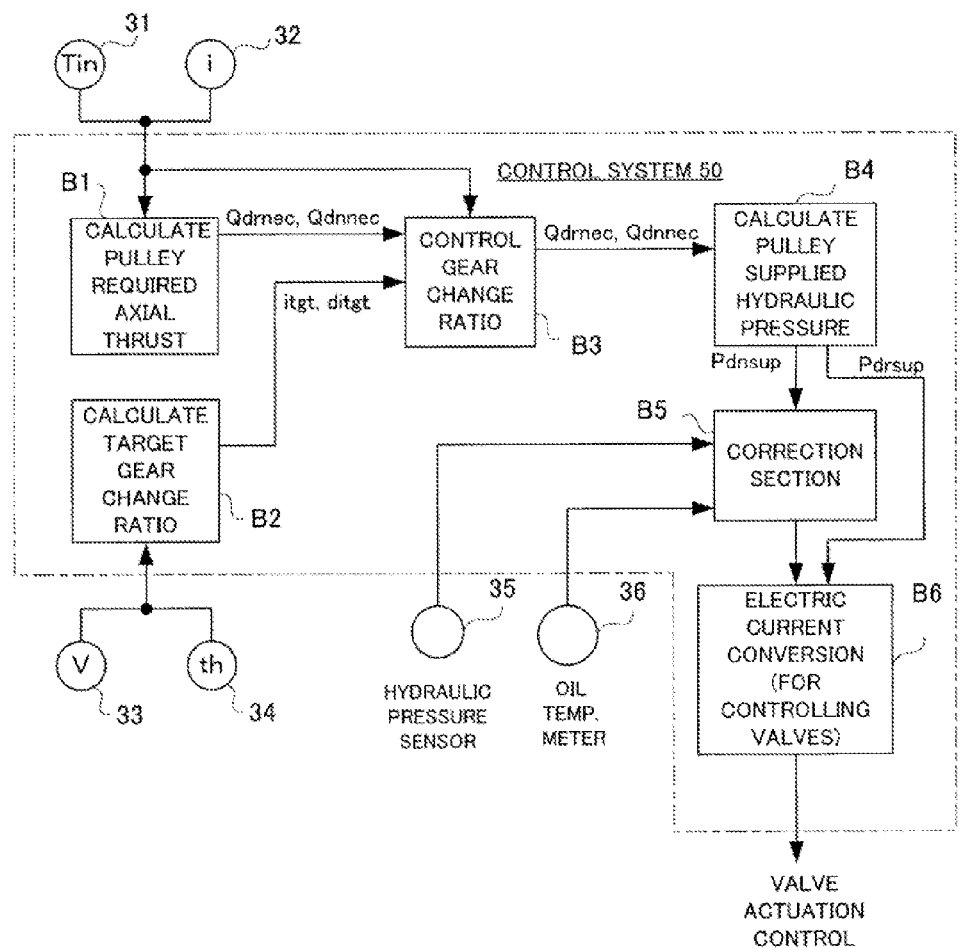
FIG. 2 is a block diagram conceptually illustrating an outline of a control system for a belt-type continuously variable transmission in accordance with an embodiment of the present invention.

In this control, various operating conditions are detected, and the control as described above is conducted on the basis of the detected operating conditions. Therefore, as shown in FIG. 2, a control system 50 includes an input torque detector 31 for detecting transmission input torque (torque input from an engine ENG to the input shaft 1) (Tin), a gear change ratio detector 32 for detecting the gear change ratio (i) of the belt mechanism 10, a vehicle speed sensor 33 for detecting a vehicle speed (V), and a throttle opening sensor 34 for detecting an engine throttle opening (th) (in other words, acceleration instruction information). The input torque detector 31 may directly detect the input torque, but may obtain the transmission input torque from the engine output torque which is calculated from the engine intake negative pressure and the engine speed. Further, the gear change ratio detector 32 may directly detect the gear change ratio from the axial position of the movable half pulley. However, the gear change ratio may be obtained by detecting rotational speeds of the driving pulley and the driven pulley and comparing them. An accelerator opening sensor for detecting an accelerator opening may be used instead of the throttle opening sensor 34. Detection signals from the detectors (sensors) are input to the control system 50 and undergo computing processes to output an actuation control signal for speed change control valves for controlling hydraulic pressure to be supplied to the driving-side and driven-side cylinder chambers 14 and 19. The speed change control valves are, for example, linear solenoid valves, which receive the actuation control signal to control the hydraulic pressures of the driving-side and driven-side cylinder chambers 14 and 19 are thereby controlled.

A computation process of the control system 50 will be described in detail below. A transmission input torque (Tin) signal detected by the input torque detector 31 and a gear change ratio (i) signal detected by the gear change ratio detector 32 are input to a pulley required axial thrust calculation section B1. Here, in response to the input torque (Tin) and the gear change ratio (i), a driving-side pulley required axial thrust (Qdrnec) and a driven-side pulley required axial thrust (Qdnnec) are obtained as minimum required axial thrusts in the range in which belt slip is prevented.

Meanwhile, at the same time, a vehicle speed (V) signal detected by the vehicle speed sensor 33 and an engine throttle opening (th) signal detected by the engine throttle opening sensor 34 are input to a target gear change ratio calculation section B2. Here, a target gear change ratio (itgt) is obtained in response to the vehicle speed (V) and the throttle opening (th). Further, a target gear change ratio changing rate (ditgt) is obtained as a change amount per time of the target gear change ratio (itgt).

Further, the transmission input torque (Tin) signal detected by the input torque detector 31, the gear change ratio (i) signal detected by the speed change ratio detector 32, driving-side pulley required axial thrust (Qdrnec) signal and driven-side pulley required axial thrust (Qdnnec) signal that are obtained by the pulley required axial thrust calculation section B1, target gear change ratio (itgt) signal and target gear change ratio changing rate (ditgt) signal that are obtained by the target gear change ratio calculation section B2 are input to a gear change ratio control section B3. The gear change ratio control section B3, on the basis of the input signals, determines target axial thrusts (Qdrcmd and Qdncmd) of driving-side and driven-side pulleys that are required to change a current gear change ratio to the target gear change ratio (itgt) at the target gear change ratio changing rate (ditgt).

Target axial thrust signals (Qdrcmd and Qdncmd) determined in such a manner are input to a pulley supplied hydraulic pressure calculation section B4. The pulley supplied hydraulic pressure calculation section B4 obtains target supplied hydraulic pressures (Pdrsup and Pdnsup) of the driving-side and driven-side cylinder chambers 14 and 19 which are required to obtain the target axial thrusts. Specifically, the target axial thrusts (Qdrcmd and Qdncmd) are divided by the areas of the cylinder chambers 14 and 19 that receive the pressures to obtain hydraulic pressures required for the cylinder chambers. The obtained values are further corrected with hydraulic pressure variation factors to obtain the target supplied hydraulic pressures (Pdrsup and Pdnsup).

The driving-side and the driven-side target supplied hydraulic pressure signals (Pdrsup and Pdnsup) obtained in such a manner are input to an electric current conversion section B6 via a correction section B5. The electric current conversion section B6 obtains actuation control electric current signals for the speed change control valves that control the hydraulic pressures supplied to the driving-side and driven-side cylinder chambers 14 and 19. The speed change control valves are, for example, linear solenoid valves, which are controlled to operate with the control electric current obtained in the electric current conversion section B6 and control the hydraulic pressures of the driving-side and driven-side cylinder chambers 14 and 19 according to the target supplied hydraulic pressures (Pdrsup and Pdnsup). Parts of the control system 50 except for the electric current conversion section B6 are implemented by a computer included in an electronic control unit for a vehicle.

A configuration for calculating the target supplied hydraulic pressures (Pdrsup and Pdnsup) is not limited to the above-described example, but any configurations may be employed. As described later, the present invention has a feature that the correction section B5 is provided to appropriately secure the minimum required surplus pressure.

Figure 3:
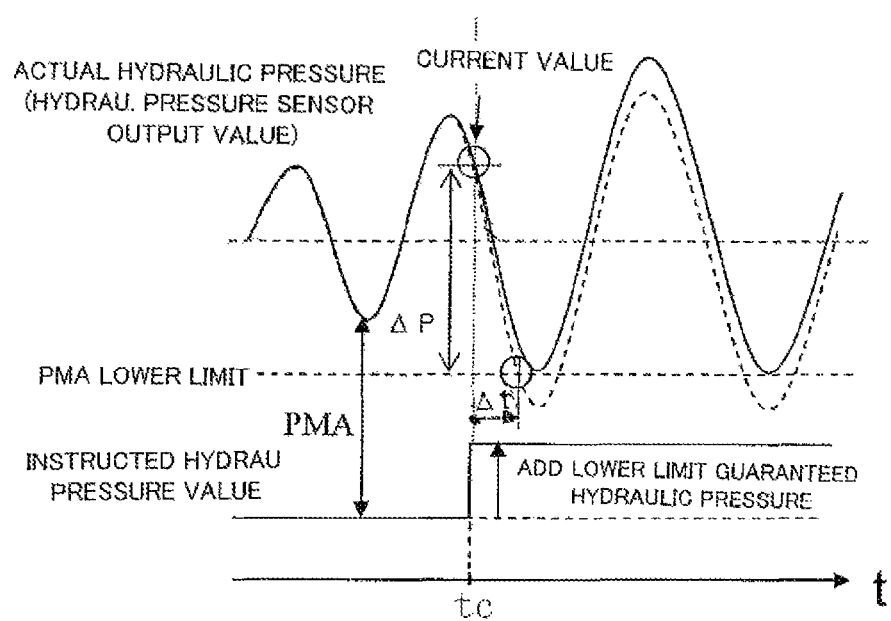
FIG. 3 is a time chart for explaining an operating concept of "process of calculating addition amount for lower limit guaranteed hydraulic pressure" that is executed by a correction section in FIG. 2.

FIG. 3 is a time chart for explaining an operating concept of "process of calculating addition amount for lower limit guaranteed hydraulic pressure" that is executed by the correction section B5. In FIG. 3, "instructed hydraulic pressure value" corresponds to the target supplied hydraulic pressure (Pdrsup or Pdnsup). "Actual hydraulic pressure" represents an example of "detected hydraulic pressure value" that is detected by the hydraulic pressure sensor 35. The hydraulic pressure sensor 35 is provided, for example, to detect the hydraulic pressure of the driven-side cylinder chamber 19. FIG. 3 represents an example where the actual hydraulic pressure pulsates. PMA denotes surplus pressure. As shown by the following equation, the difference between the actual hydraulic pressure (detected hydraulic pressure value) and the instructed hydraulic pressure value (target supplied hydraulic pressure) is constantly calculated as surplus pressure PMA. Further, "PMA lower limit" corresponds to a minimum required hydraulic pressure.

PMA=actual hydraulic pressure (detected hydraulic pressure value)−instructed hydraulic pressure value (target supplied hydraulic pressure)

Basically, the correction section B5 predicts a hydraulic pressure decreasing amount in a prescribed time (for example, 100 ms) at a current hydraulic pressure changing rate on the basis of the detected hydraulic pressure value by the hydraulic pressure sensor 35. If it is predicted that PMA (or a possible hydraulic pressure) will be lower than the minimum required hydraulic pressure, correction to increase the supplied hydraulic pressure (the target supplied hydraulic pressure Pdnsup of the driven pulley 16) is conducted. FIG. 3 illustrates a case where a hydraulic pressure decreasing amount $\Delta P$ in a prescribed time $\Delta t$ which is predicted from the current value of the actual hydraulic pressure at point tc will be "PMA lower limit" (minimum required hydraulic pressure) or lower. In other words, if the correction in accordance with the present invention is not conducted, a case where the actual hydraulic pressure pulsates as shown by the dotted line is assumed. When the correction section B5 determines at point tc that the hydraulic pressure decreasing amount $\Delta P$ in the prescribed time $\Delta t$ which is predicted from the current value of the actual hydraulic pressure will be "PMA lower limit" (minimum required hydraulic pressure) or lower, the correction section B5 conducts correction to add a prescribed "hydraulic pressure addition amount for guaranteeing lower limit" to the instructed hydraulic pressure value (in other words, to increase the supplied hydraulic pressure). Accordingly, as represented by the solid line, control is carried out to prevent the actual hydraulic pressure from becoming lower than "PMA lower limit" (minimum required hydraulic pressure).

Figure 4:
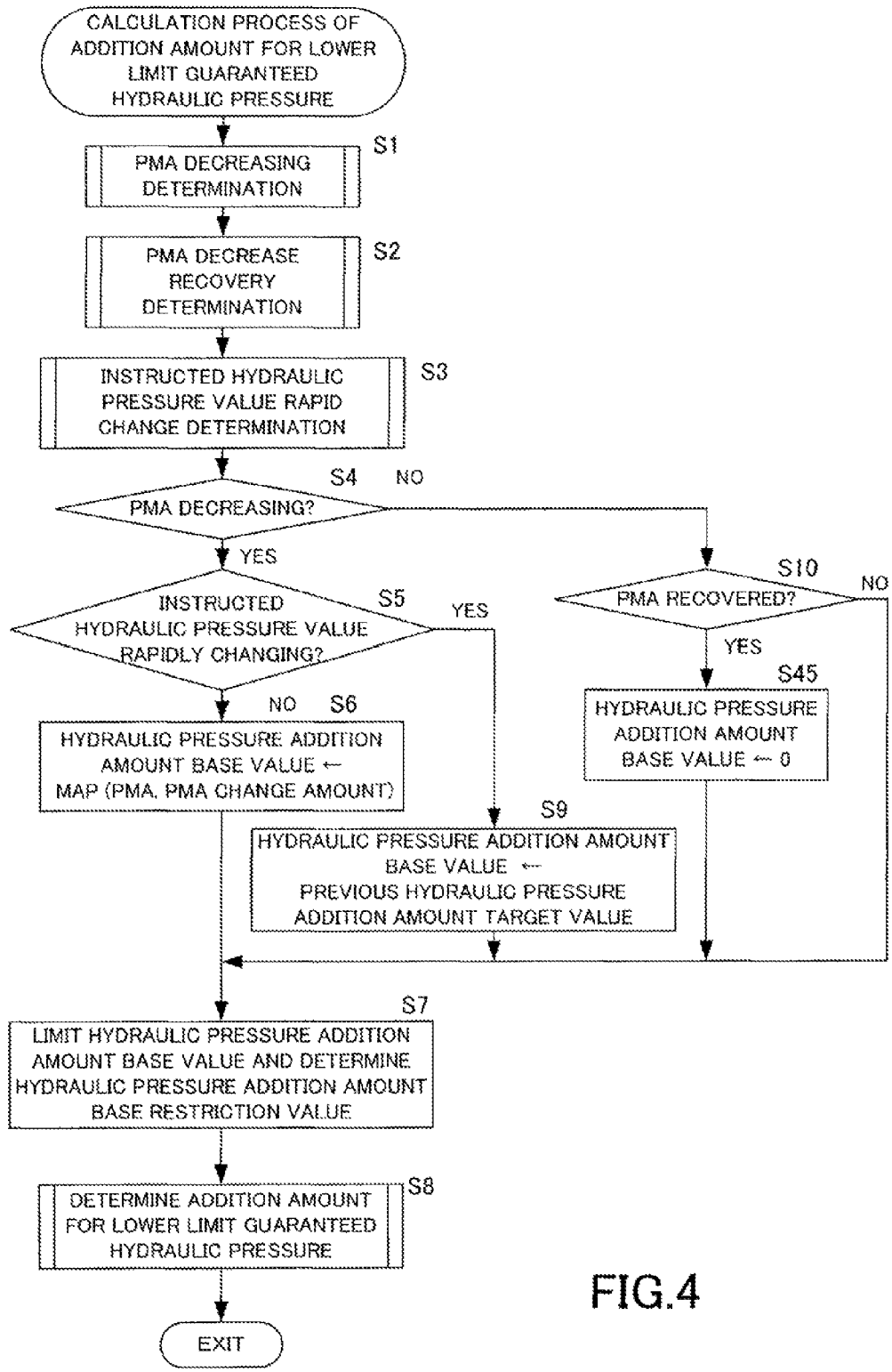
FIG. 4 is a flowchart illustrating a specific example of "process of calculating addition amount for lower limit guaranteed hydraulic pressure" that is executed by the correction section in FIG. 2.

FIG. 4 is a flowchart illustrating an example of the "process of calculating addition amount for lower limit guaranteed hydraulic pressure" that is executed by the correction section B5. In "PMA decreasing determination" routine S1, a determination is made about whether the predicted surplus pressure PMA in the prescribed time Δt will become "PMA lower limit" (minimum required hydraulic pressure) or lower.

Figure 5:
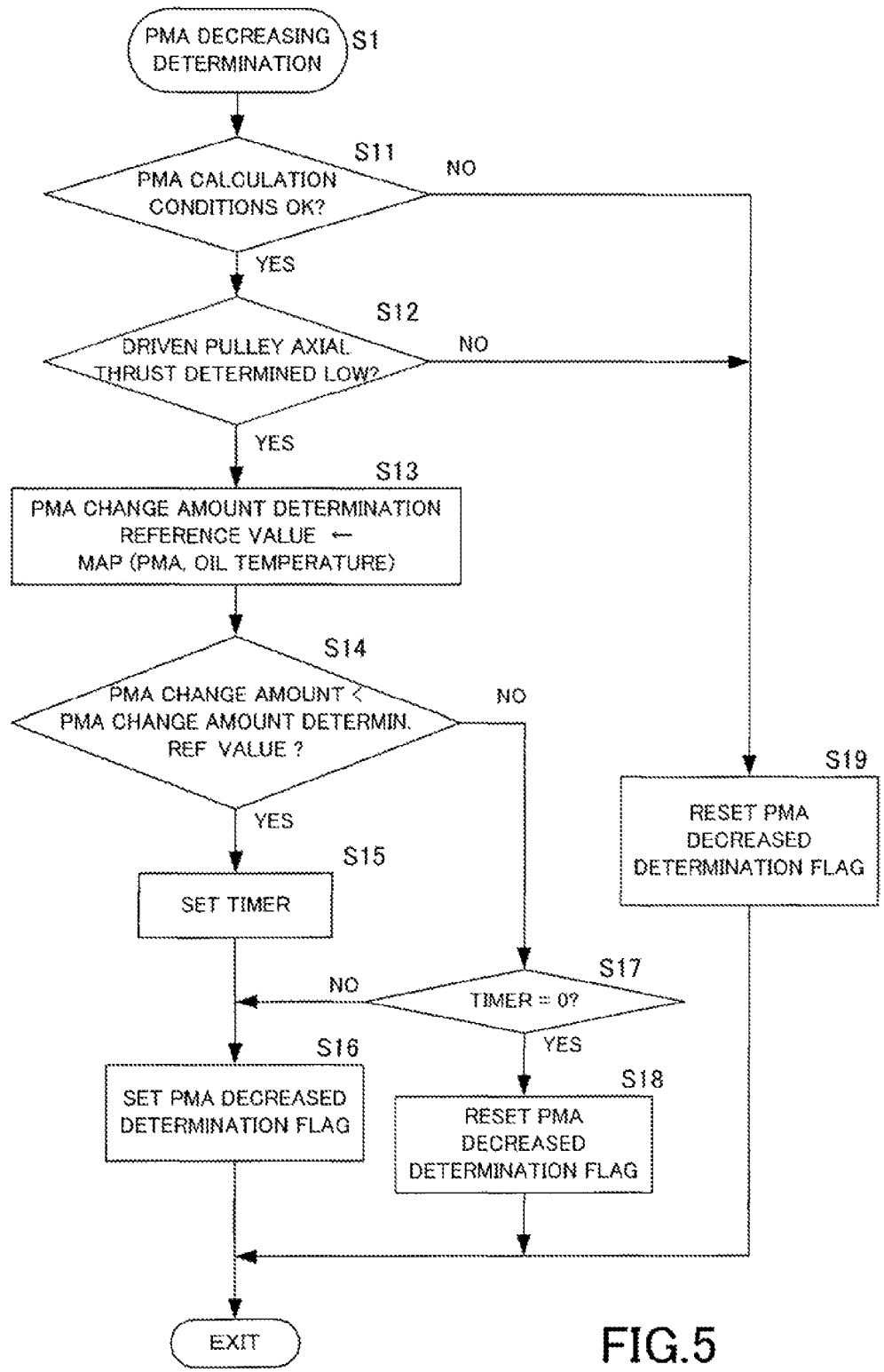
FIG. 5 is a flowchart illustrating a specific example of "PMA decreasing determination" routine in FIG. 4.

FIG. 5 illustrates a specific example of "PMA decreasing determination" routine S1. In step S11, a determination is made about whether the state of a vehicle satisfies prescribed PMA calculation conditions. Only if the engine speed, detected hydraulic pressure value, and so forth satisfy the prescribed PMA calculation conditions, the process progresses to step S12 and continues "PMA decreasing determination". If the prescribed PMA calculation conditions are not satisfied, for example, if the vehicle is in an operation state where the surplus pressure PMA control in accordance with the present invention should not be conducted, "PMA decreasing determination" is terminated and a PMA decreased determination flag is reset in step S19.

In step S12, a determination is made about whether the current axial thrust of the driven pulley 16 has decreased to the axial thrust value of the driving pulley 11 or lower. If the determination is YES, the process progresses to step S13 and continues "PMA decreasing determination". The current axial thrust of the driven pulley 16 is determined on the basis of the detected hydraulic pressure value of the hydraulic pressure sensor 35 for detecting the hydraulic pressure of the driven-side cylinder chamber 19. If the current axial thrust of the driven pulley 16 is not lower than the axial thrust of the driving pulley 11, since it is not necessary to consider the possibility of decrease in the surplus pressure PMA, "PMA decreasing determination" is terminated and the PMA decreased determination flag is reset.

Figure 6:
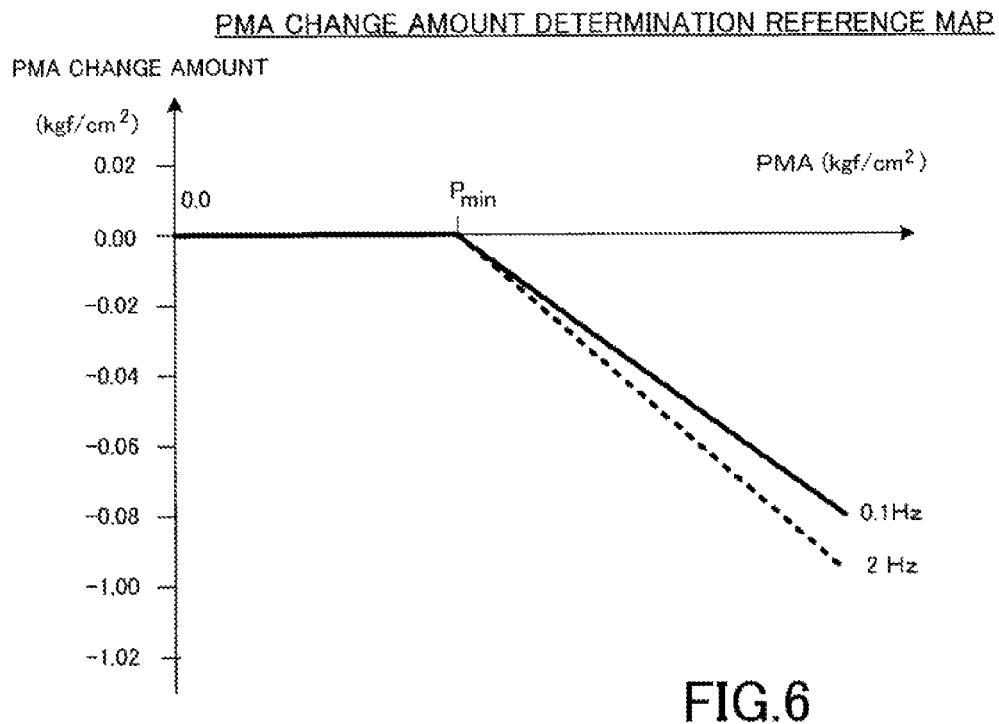
FIG. 6 is an exemplary map used for obtaining a PMA change amount determination reference value.

In step S13, a PMA change amount determination reference value is obtained according to the current surplus pressure PMA (the difference between the actual hydraulic pressure and the instructed hydraulic pressure value) and an oil temperature measured by an oil temperature meter 36 (See FIG. 2). FIG. 6 represents an exemplary map used for obtaining the PMA change amount determination reference value. The horizontal axis represents the surplus pressure PMA, and the vertical axis represents the PMA change amount per unit time (that is, surplus pressure changing rate). The unit time is, for example, a period for an execution cycle of "PMA decreasing determination" routine S1. The map is for predicting whether or not a possible hydraulic pressure in the prescribed time becomes lower than the minimum required hydraulic pressure by use of a function of the surplus pressure changing rate with respect to the current surplus pressure (PMA). The map has different characteristics corresponding to hydraulic pressure pulsation frequencies to be compensated. FIG. 6 represents at a time the function characteristics for the cases where the hydraulic pressure pulsation frequency is 0.1 Hz and 2 Hz, as an example. To remedy adverse effects due to hydraulic pressure pulsation, the hydraulic pressure pulsation frequency (for example, in a case of the pulsation at 2 Hz, 2 Hz is targeted) to be remedied is identified, and the map corresponding to the identified hydraulic pressure pulsation frequency is used. This allows optimum control corresponding to the hydraulic pressure pulsation frequency to be remedied.

A method for using the map will be described. On the map, the current surplus pressure PMA is applied to the horizontal axis, the corresponding value on the vertical axis is obtained as the PMA change amount determination reference value. Then, the obtained PMA change amount determination reference value is compared with the current PMA change amount. If the current PMA change amount is equal to or less than the obtained PMA change amount determination reference value, it is predicted that the hydraulic pressure decreasing amount in the prescribed time will become lower than the minimum required hydraulic pressure. On the basis of the prediction, correction is conducted to increase the supplied hydraulic pressure. Accordingly, the function (curve) of the PMA change amount determination reference value which appears on the map represents the reference line for the determination predicting that the hydraulic pressure decreasing amount in the prescribed time becomes lower than the minimum required hydraulic pressure.

The map characteristics shown in FIG. 6 represent the characteristics at a particular oil temperature. In the example in the figure, in the range in which the surplus pressure PMA on the horizontal axis is zero through a prescribed minimum guaranteed pressure (Pmin kgf/cm$^2$), the PMA change amount determination reference value sustains zero (this corresponds to no change in PMA). In the range in which the PMA is higher than the minimum guaranteed pressure (Pmin kgf/cm$^2$), the PMA change amount determination reference value changes in the negative area (that is, the area of decreasing change) with an inclination characteristic corresponding to each hydraulic pressure pulsation frequency. Such a characteristic means that if the current surplus pressure PMA is lower than the minimum guaranteed pressure (Pmin kgf/cm$^2$), prediction is made such that the hydraulic pressure decreasing amount in the prescribed time becomes lower than the minimum required hydraulic pressure and control is conducted to increase the supplied hydraulic pressure even if the PMA change amount is zero. In other words, if the PMA change amount is zero, control is conducted to constantly retain the surplus pressure PMA not to be lower than the minimum guaranteed pressure (Pmin kgf/cm$^2$). Further, in the range in which the PMA is higher than the minimum guaranteed pressure (Pmin kgf/cm$^2$), it is predicted that the hydraulic pressure decreasing amount in the prescribed time will become lower than the minimum required hydraulic pressure when the PMA change amount becomes a prescribed determination reference value of zero or lower (a negative value indicating decrease) according to the inclination characteristic of the map, and control is conducted to increase the supplied hydraulic pressure. As described above, supplied hydraulic pressure increase control is appropriately conducted according to the inclination characteristic on the map in the range in which the PMA is higher than the minimum guaranteed pressure (Pmin kgf/cm$^2$). A particular amount of extra hydraulic pressure is not continuously added to secure regular surplus pressure, but appropriate control is conducted such that the supplied hydraulic pressure is increased only when necessary to secure minimum required surplus pressure.

Since the relationship between the hydraulic pressure acting on the pulleys and the pulley axial thrusts (belt clamping force) obtained by this hydraulic pressure changes according to the change in oil viscosity depending on the oil temperature, the map characteristic shown in FIG. 6 can be modified with the oil temperature being its parameter. As described above, the map characteristic shown in FIG. 6 is modified with the oil temperature being its parameter, the "minimum required hydraulic pressure" is thereby appropriately and variably set according to the oil temperature.

Returning to FIG. 5, in step S14, a determination is made about whether the current PMA change amount is lower than the PMA change amount determination reference value obtained in step S13 (in other words, whether change in the negative direction, that is, decreasing change is greater than the reference value). If the determination is YES, a prescribed timer is set in step S15, and the PMA decreased determination flag is thereafter set in step S16. If the determination is NO, a check is made about whether a timer value has become zero (whether time is up). If the timer value has not become zero, the PMA decreased determination flag is set in step S16. If the timer value has become zero, the PMA decreased determination flag is reset in step S18. Accordingly, the PMA decreased determination flag that has been temporarily set before normal operating time of the timer has been reached is reset. When the PMA decreased determination flag is set, it means that it is predicted that the possible hydraulic pressure in the prescribed time will become lower than the minimum required hydraulic pressure.

Returning to FIG. 4, via "PMA decreasing determination" routine S1, "PMA decrease recovery determination" routine S2, and "instructed hydraulic pressure value rapid change determination" routine S3, a check is made about whether the PMA decreased determination flag has been set. If the PMA decreased determination flag has been set, the process progresses to step S6 via step S5. In step S5, a determination is made about whether an instructed hydraulic pressure value rapid change flag has been set. Setting/resetting of this flag is controlled by a process of "instructed hydraulic pressure value rapid change determination" routine S3, which will be described later. The instructed hydraulic pressure value rapid change flag is normally reset. In this case, it is determined NO in step S5, and the process progresses to step S6. By following process of steps S6, S7, and S8, control to increase the supplied hydraulic pressure is conducted.

In step S6, a hydraulic pressure addition amount base value is obtained from a prescribed map in response to the current surplus pressure PMA and PMA change amount. In step S7, a process for limiting the hydraulic pressure addition amount base value obtained in previous step S6 is conducted. Specifically, if the hydraulic pressure addition amount base value obtained in step S6 exceeds a prescribed limit value, the hydraulic pressure addition amount base value is limited so that the limit value is a maximum value. The hydraulic pressure addition amount base value, which is limited in such a manner, is set as a hydraulic pressure addition amount base restriction value.

Figure 8:
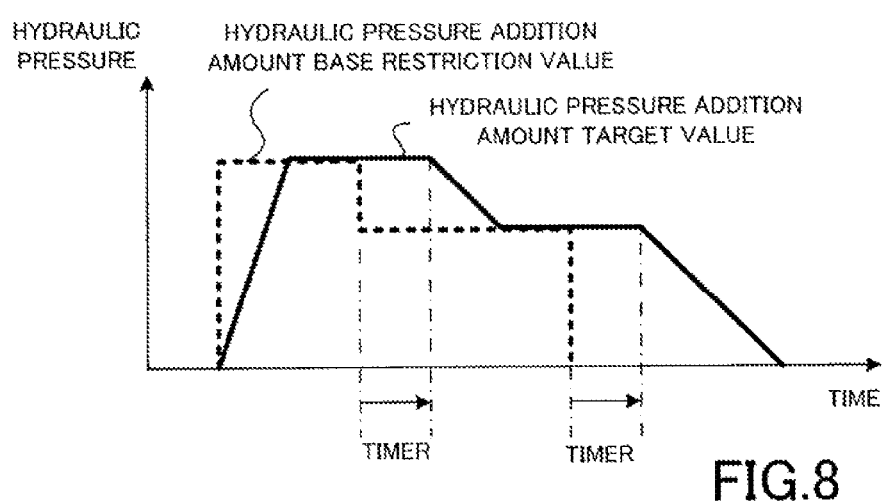
FIG. 8 is a graph representing an example of an operation of FIG. 7.
Figure 7:
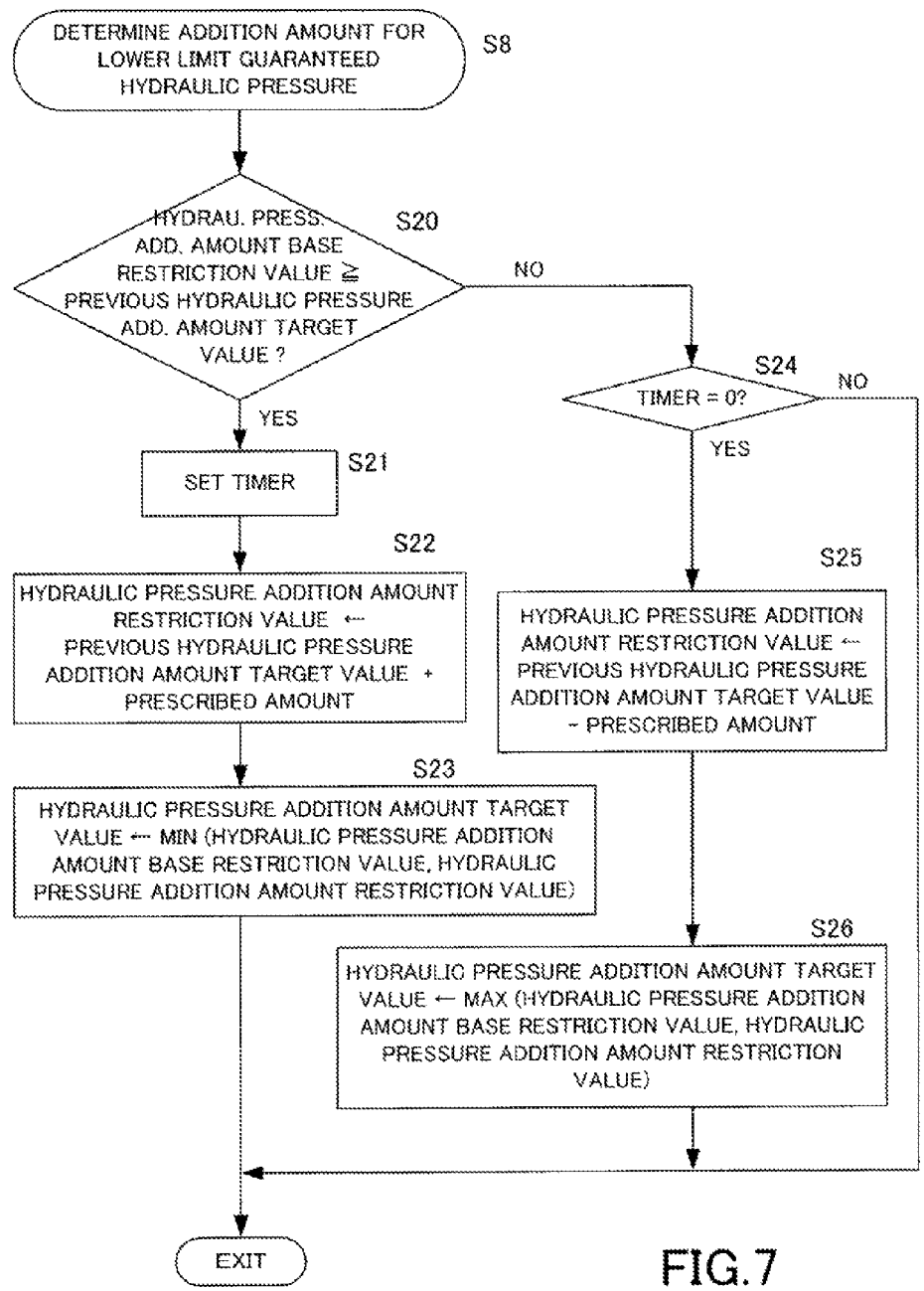
FIG. 7 is a flowchart illustrating a specific example of "routine for determination of addition amount for lower limit guaranteed hydraulic pressure" in FIG. 4.

In step S8, a routine for determination of addition amount for lower limit guaranteed hydraulic pressure is conducted, in which an addition amount for lower limit guaranteed hydraulic pressure is determined on the basis of the hydraulic pressure addition amount base restriction value obtained in previous step S7. FIG. 7 illustrates the routine for determination of addition amount for lower limit guaranteed hydraulic pressure. The hydraulic pressure addition amount base restriction value obtained in step S7 is, for example, a value that changes stepwise as shown by a dotted line 100 in FIG. 8. In the routine S8 for determination of addition amount for lower limit guaranteed hydraulic pressure (FIG. 7), the hydraulic pressure addition amount base restriction value which changes stepwise in such a manner is converted into a value which does not rapidly change, for example, as shown by a solid line 101 in FIG. 8. The converted value is output as a hydraulic pressure addition amount target value.

In FIG. 7, in step S20, a determination is made about whether the hydraulic pressure addition amount base restriction value obtained in previous step S7 is equal to or larger than a previous hydraulic pressure addition amount target value. If the determination is YES, it means that the hydraulic pressure addition amount target value is required to be larger than the previous value. First, a prescribed timer is set in step S21. In step S22, a prescribed amount is added to the previous hydraulic pressure addition amount target value to be set as a "hydraulic pressure addition amount restriction value". Next, in step S23, the smaller value between the "hydraulic pressure addition amount base restriction value" and the "hydraulic pressure addition amount restriction value" is set as a new "hydraulic pressure addition amount target value". In other words, an increase in the hydraulic pressure addition amount target value per process cycle is restricted to the "prescribed amount". This restriction moderates the change in which the hydraulic pressure addition amount target value increases (preventing a rapid increasing change). The hydraulic pressures (the target supplied hydraulic pressure (Pdrsup and Pdnsup)) of hydraulic system for producing the pulley axial thrusts is set according to the "hydraulic pressure addition amount target value" set in this step S23.

On the other hand, if the hydraulic pressure addition amount base restriction value is smaller than the previous hydraulic pressure addition amount target value, the hydraulic pressure addition amount target value is required to be reduced. The process progresses via a determination of NO in step S20 to step S24. In step S24, a check is made about whether a timer value set in previous step S21 has become zero. If the timer value has not become zero, an ongoing process ends. If the timer value has become zero, a prescribed amount is subtracted from the previous hydraulic pressure addition target value to be set as the "hydraulic pressure addition amount restriction value" in step S25. Next, in step S26, the larger value between the "hydraulic pressure addition amount base restriction value" and "hydraulic pressure addition amount restriction value" is set as a new "hydraulic pressure addition amount target value". This moderates the change in which the hydraulic pressure addition amount target value decreases (preventing a rapid decreasing change). The hydraulic pressure (the target supplied hydraulic pressure) of the hydraulic system for producing the pulley axial thrusts is set according to the "hydraulic pressure addition amount target value" set in this step S26. The timer used in these steps provides a delay of a prescribed period in control to decrease the hydraulic pressure addition amount target value. Response delay is thereby provided in hydraulic pressure decreasing control, thus preventing shortage in the pulley axial thrusts.

Figure 9:
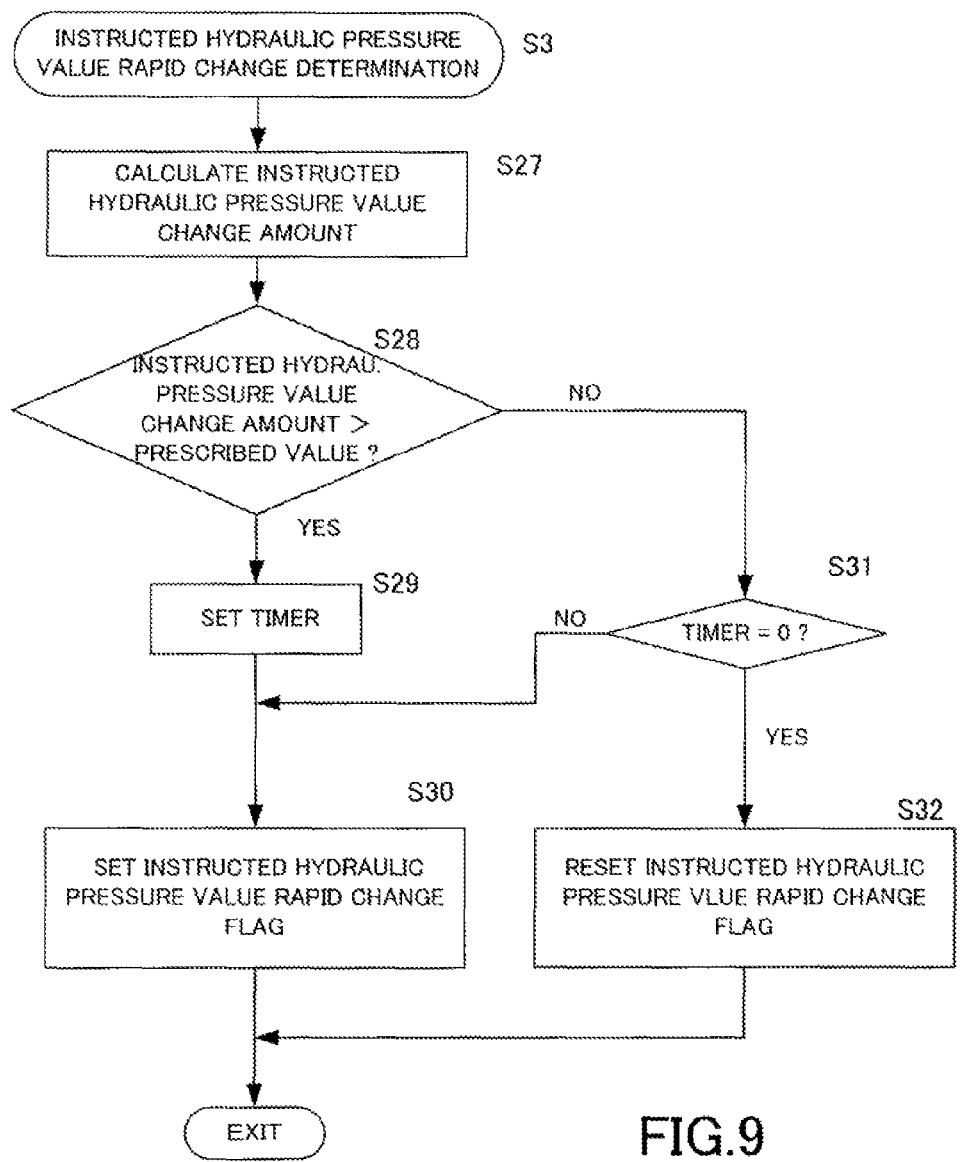
FIG. 9 is a flowchart illustrating a specific example of "instructed hydraulic pressure value rapid change determination" in FIG. 4.

Returning to FIG. 4, in "instructed hydraulic pressure value rapid change determination" routine S3, a determination is made about whether or not the instructed hydraulic pressure value (target supplied hydraulic pressure) has rapidly changed. FIG. 9 illustrates an exemplary process executed in this "instructed hydraulic pressure value rapid change" routine S3. In step S27, the difference between the previous instructed hydraulic pressure value (target supplied hydraulic pressure) and the current instructed hydraulic pressure value (target supplied hydraulic pressure) is calculated as an instructed hydraulic pressure value change amount. In step S28, a determination is made about whether this instructed hydraulic pressure value change amount is larger than a prescribed value. If this instructed hydraulic pressure value change amount is larger than the prescribed value, it is determined that the instructed hydraulic pressure value is rapidly changing. A prescribed timer is set in step S29. An instructed hydraulic pressure value rapid change flag is set in step S30. Accordingly, it is determined the instructed hydraulic pressure value (target supplied hydraulic pressure) has rapidly changed.

If the instructed hydraulic pressure value change amount is not larger than the prescribed value, the process progresses via a determination of NO in step S28 to step S31. In step S31, a check is made about whether a timer value set in aforementioned step S29 has become zero. If the timer value has not become zero, the process progresses to step S30 and the instructed hydraulic pressure value rapid change flag is set. If the timer value has become zero, the process progresses to step S32 and the instructed hydraulic pressure value rapid change flag is reset. This timer sustains a determination of "instructed hydraulic pressure value rapid change" for a prescribed period once the instructed hydraulic pressure value rapid change flag has been set, thereby preventing the determination of "instructed hydraulic pressure value rapid change" from unstably fluctuating.

Returning to FIG. 4, if the instructed hydraulic pressure value rapid change flag has been set, the process progresses via a determination of YES in step S5 to step S9. The previously calculated "hydraulic pressure addition amount target value" (hydraulic pressure addition value) is set as the hydraulic pressure addition amount base value. Subsequently, the process progresses to step S7. Further, a process of step S8 is executed, and calculation of "hydraulic pressure addition amount target value" as described above is carried out. Accordingly, in ongoing computing, the previously calculated "hydraulic pressure addition amount target value" (hydraulic pressure addition value) is calculated as a current "hydraulic pressure addition amount target value" (hydraulic pressure addition value) with no change. Therefore, if the target supplied hydraulic pressure has rapidly changed, the previously calculated "hydraulic pressure addition amount target value" is used as the current "hydraulic pressure addition amount target value" (hydraulic pressure addition value). Correction is thereby conducted to stably increase the supplied hydraulic pressure. In step S9, the larger value between the hydraulic pressure addition amount base value obtained from a prescribed map according to the current surplus pressure PMA and PMA change amount and the previous "hydraulic pressure addition amount target value" may be set as the current hydraulic pressure addition amount base value. This allows an improvement in response in a rapid change in which the instructed hydraulic pressure value is increased.

Figure 10:
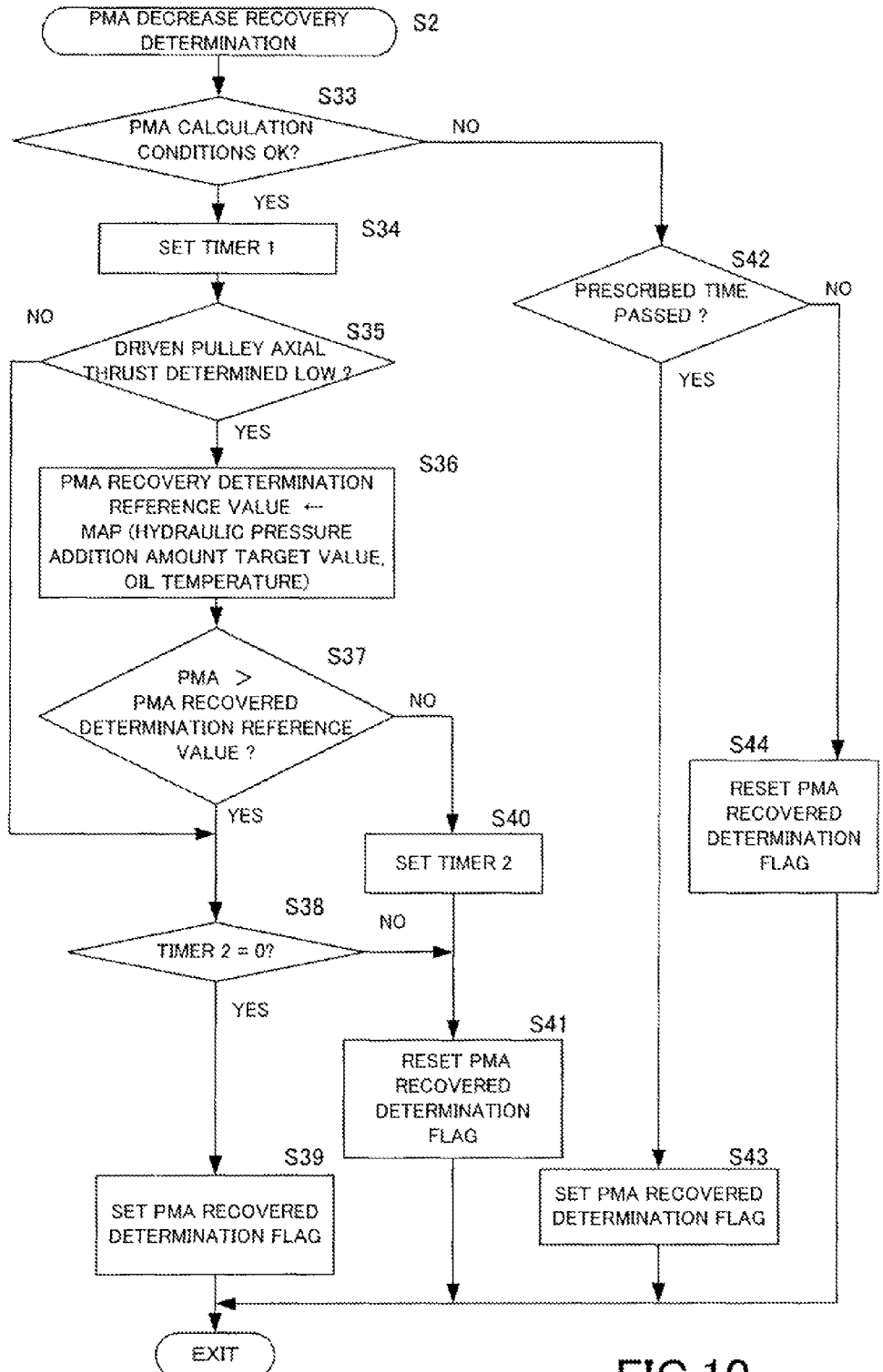
FIG. 10 is a flowchart illustrating an example of "PMA decrease recovery determination" routine in FIG. 4.

In FIG. 4, in "PMA decrease recovery determination" routine S2, a determination is made about whether the surplus pressure PMA is recovered from a decrease. FIG. 10 illustrates an exemplary process executed in this "PMA decrease recovery determination" routine S2. In step S33, similarly to step S11 (FIG. 5), a determination is made about whether the state of a vehicle satisfies prescribed PMA calculation conditions. If the engine speed, detected hydraulic pressure value, and so forth satisfy the prescribed PMA calculation conditions, the process progresses via a determination of YES in step S33 to step S34, and a prescribed timer 1 is set. The process further progresses to step S35, and "PMA decrease recovery determination" is continued. On the other hand, the prescribed PMA calculation conditions are not satisfied, the process progresses via a determination of NO in step S33 to step S42, and a check is made about whether or not a prescribed operating time of the timer 1 has passed. If the prescribed time has passed, a PMA recovered determination flag is set (S43). If the prescribed time has not passes, the PMA recovered determination flag is reset (S44). In other words, once control to cope with PMA decrease in accordance with the present invention has started, even if the hydraulic system falls into an operating state where such a control should not be conducted, the PMA recovered determination flag is not immediately set, but the PMA recovered determination flag is set if such an operating state continues for a prescribed period of time.

In step S35, similarly to step S12 (FIG. 5), a determination is made about whether a current axial thrust of the driven pulley 16 has decreased to a prescribed value or lower. If the determination is YES, the process progresses to step S36. If the control to cope with PMA decrease in accordance with the present invention has started (that is, the PMA decreased determination flag is set), the determination in step S35 becomes NO at least once, and the process then progresses to step S36. In step S36, a PMA recovered determination reference value is obtained according to the current hydraulic pressure addition amount target value and oil temperature. In next step S37, a determination is made about whether the current surplus pressure PMA is larger than the PMA recovered determination reference value. Immediately after starting control to cope with PMA decrease in accordance with the present invention, the determination in step S37 is NO. The process then progresses to step S40, and a prescribed timer 2 is set. The flag on PMA decrease recovered determination is reset (S41).

When the control to cope with PMA decrease in accordance with the present invention is conducted, the surplus pressure PMA increases, and the current surplus pressure PMA becomes larger than the PMA recovered determination reference value, it is determined YES in step S37, and the process progresses to step S38. In step S38, a check is made about whether the value of the prescribed timer 2 has become zero (that is, whether time is up). If the timer value has not become zero, the PMA recovered determination flag is reset in step S41. However, if the timer value has become zero, the process progresses to step S39, and the PMA recovered determination flag is set.

Returning to FIG. 4, if it is determined that the PMA decreased determination flag has not been set in step S4, the process progresses to step S10, and a check is made about whether the PMA recovered determination flag has been set. If the PMA recovered determination flag has been set, the hydraulic pressure addition amount base value is set to zero in step S45. The process thereafter progresses to step S7. Accordingly, the process through the route of S24, S25, and S26 in FIG. 7 makes the hydraulic pressure addition amount target value gradually decrease.

This application is based on, and claims priority to, Japanese patent application No. 2011-087805 filed on 11 Apr. 2011. The disclosure of the priority application, in its entirety, including the drawings, claims, and the specification thereof, are incorporated herein by reference.

What is claimed is:

1. A control system for a belt-type continuously variable transmission which transmits an engine output to wheels by changing gears in a nonstep manner, the control system adapted to obtain a target gear change ratio and a target gear change ratio changing rate based on a vehicle speed and acceleration instruction information, obtain a driven pulley required axial thrust required for motive power transmission in response to a transmission input torque and a gear change ratio without causing a belt slip, set the driven pulley required axial thrust as a driven pulley target axial thrust, set an axial thrust required by a driven pulley for changing the gear change ratio to the target gear change ratio at the target gear change ratio changing rate by use of the driven pulley target axial thrust as a driving pulley target axial thrust, and conduct speed change control by controlling an actuation hydraulic pressure based on target supplied hydraulic pressure set in response to the driven pulley target axial thrust and the driving pulley target axial thrust, the control system comprising a correction section adapted to predict a hydraulic pressure decreasing amount likely to occur in a prescribed time at a current hydraulic pressure changing rate based on a hydraulic pressure value of the actuation hydraulic pressure detected by a hydraulic pressure sensor, predict an actuation hydraulic pressure likely to occur in the prescribed time based on the predicted hydraulic pressure decreasing amount, and conduct a correction to increase supplied hydraulic pressure if the predicted actuation hydraulic pressure is lower than a minimum required hydraulic pressure that is a predetermined surplus pressure for the actuation hydraulic pressure.

2. The control system for a belt-type continuously variable transmission according to claim 1, wherein the minimum required hydraulic pressure is variably set in response to an oil temperature.

3. The control system for a belt-type continuously variable transmission according to claim 1, wherein the correction section is further adapted to determine whether or not the target supplied hydraulic pressure is rapidly changed, and conduct a correction to increase the supplied hydraulic pressure by use of a previously calculated hydraulic pressure addition value as a current hydraulic pressure addition value when the target supplied hydraulic pressure is rapidly changed.

4. The control system for a belt-type continuously variable transmission according to claim 1, wherein the correction section conducts control to prevent a rapid change in the hydraulic pressure addition value for increasing the supplied hydraulic pressure.

5. The control system for a belt-type continuously variable transmission according to claim 1, wherein the correction section includes a determination section adapted to obtain a surplus pressure from a difference between the hydraulic pressure value detected by the hydraulic pressure sensor and the target supplied hydraulic pressure and determines whether or not the predicted actuation hydraulic pressure likely to occur in the prescribed time becomes lower than the minimum required hydraulic pressure based on a current surplus pressure and a changing rate of the surplus pressure.

6. The control system for a belt-type continuously variable transmission according to claim 5, wherein the determination section has a map for predicting whether or not the surplus pressure likely to occur in the prescribed time becomes lower than the minimum required hydraulic pressure by use of a function of a surplus pressure changing rate with respect to the current surplus pressure, and the map has different characteristics in response to hydraulic pressure pulsation frequencies to be compensated.

7. A computer-implemented method for controlling a belt-type continuously variable transmission which transmits an engine output to wheels by changing gears in a nonstep manner, the method comprising:
  obtaining a target gear change ratio and a target gear change ratio changing rate based on a vehicle speed and acceleration instruction information;
  obtaining a driven pulley required axial thrust required for motive power transmission in response to a transmission input torque and the gear change ratio without causing a belt slip;
  setting the driven pulley required axial thrust as a driven pulley target axial thrust;
  setting an axial thrust required by a driven pulley for changing the gear change ratio to the target gear change ratio at the target gear change ratio changing rate by use of the driven pulley target axial thrust as a driving pulley target axial thrust;
  conducting speed change control by controlling an actuation hydraulic pressure based on target supplied hydraulic pressure set in response to the driven pulley target axial thrust and the driving pulley target axial thrust;
  predicting a hydraulic pressure decreasing amount likely to occur in a prescribed time at a current hydraulic pressure changing rate based on a hydraulic pressure value of the actuation hydraulic pressure detected by a hydraulic pressure sensor;
  predicting an actuation hydraulic pressure likely to occur in the prescribed time based on the predicted hydraulic pressure decreasing amount, and
  correcting supplied hydraulic pressure to be increased if the predicted actuation hydraulic pressure is lower than a minimum required hydraulic pressure that is a predetermined surplus pressure for the actuation hydraulic pressure.

\* \* \* \* \*